Aug. 19, 1958 B. A. DOTY 2,848,290
SUPPORTING MECHANISM FOR TILTABLE TABLE TOPS AND THE LIKE
Filed Nov. 18, 1955 5 Sheets-Sheet 1

INVENTOR.
Boyd A. Doty
BY
Parker, Prochnow & Farmer,
Attorneys.

Aug. 19, 1958  B. A. DOTY  2,848,290
SUPPORTING MECHANISM FOR TILTABLE TABLE TOPS AND THE LIKE
Filed Nov. 18, 1955  5 Sheets-Sheet 2

INVENTOR.
Boyd A. Doty
BY
Parker, Brochman & Turner,
Attorneys.

Aug. 19, 1958 B. A. DOTY 2,848,290
SUPPORTING MECHANISM FOR TILTABLE TABLE TOPS AND THE LIKE
Filed Nov. 18, 1955 5 Sheets-Sheet 3
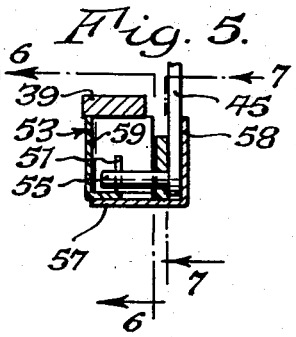
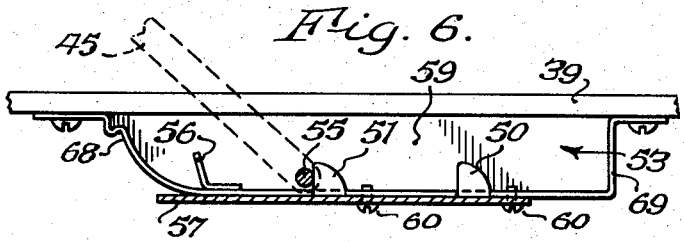
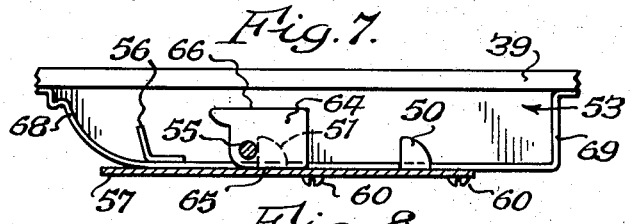
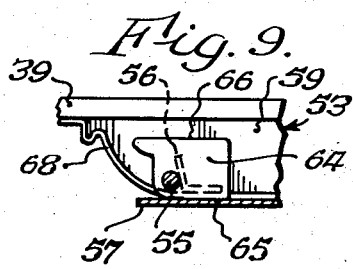
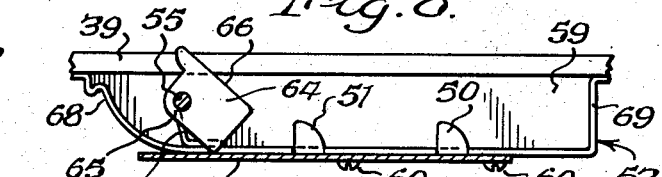
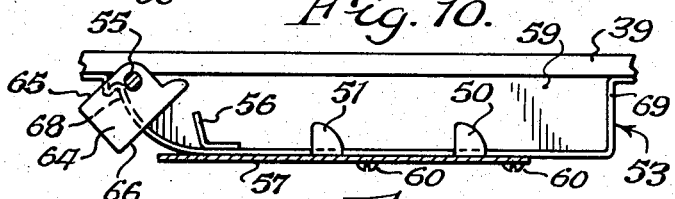
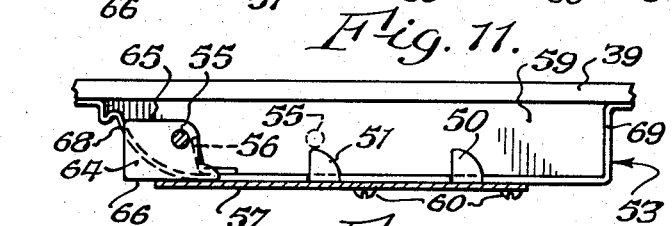
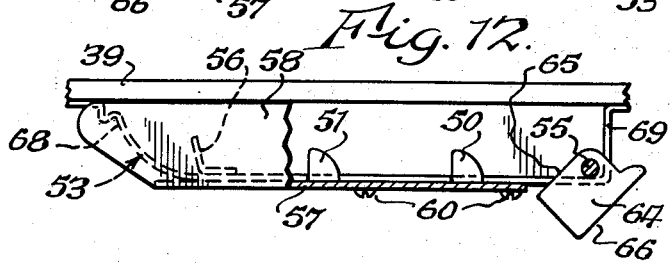
INVENTOR.
Boyd A. Doty
BY
Parker, Crochnow & Former
Attorneys.

Aug. 19, 1958   B. A. DOTY   2,848,290
SUPPORTING MECHANISM FOR TILTABLE TABLE TOPS AND THE LIKE
Filed Nov. 18, 1955   5 Sheets-Sheet 4

INVENTOR.
Boyd A. Doty,
BY
Parker Archmar & Funo.
Attorneys.

Aug. 19, 1958 B. A. DOTY 2,848,290
SUPPORTING MECHANISM FOR TILTABLE TABLE TOPS AND THE LIKE
Filed Nov. 18, 1955 5 Sheets-Sheet 5
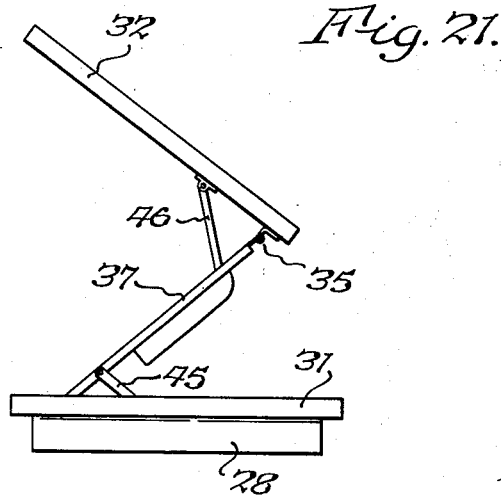
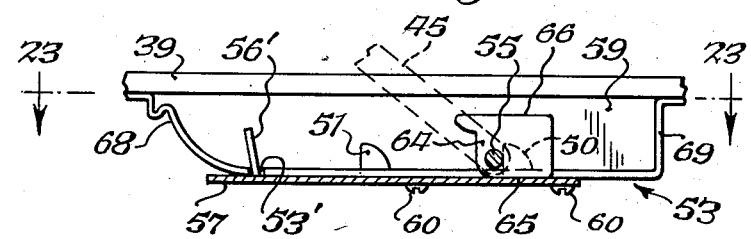
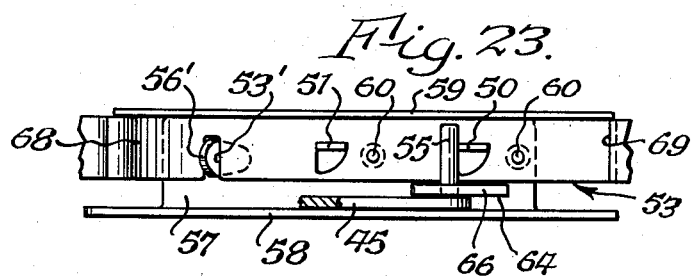
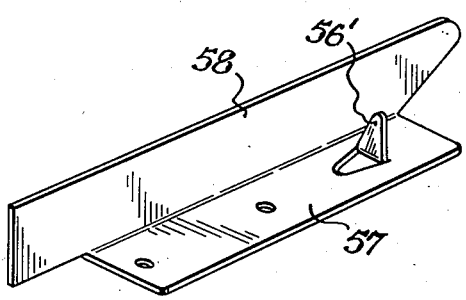
INVENTOR.
Boyd A. Doty
BY
Parker, Prochnow & Enno,
Attorneys.

United States Patent Office 2,848,290
Patented Aug. 19, 1958

2,848,290
SUPPORTING MECHANISM FOR TILTABLE TABLE TOPS AND THE LIKE

Boyd A. Doty, Buffalo, N. Y., assignor to Hard Manufacturing Company, Buffalo, N. Y.

Application November 18, 1955, Serial No. 547,783

4 Claims. (Cl. 311—38)

This invention relates to table tops of the type which may be used on overbed tables employed in hospitals and sick rooms and in which a part of the table top may be adjusted to occupy a substantially horizontal position or may be adjusted into a number of other positions. While the table top structure in the accompanying drawings is illustrated in connection with an overbed table, yet it will be understood that it is not intended to limit this invention to a table of that type.

One of the objects of this invention is to provide an adjustable table top which has a part or section which is mounted to swing from a horizontal to various inclined positions and which is provided with means of improved construction for holding this table top section in various adjusted positions.

A further object is to provide a table top section of this type in which the adjusting means therefor are of improved and simplified construction and easily operated by the user.

A further object is to provide a table top section having adjusting mechanism so that the chance of injury to the user's hands or fingers is reduced to a minimum; also to provide a table top section which cannot be tipped over accidentally; also to provide a table top section with a mirror which may be adjusted into many different positions, including a position in which the user may see his face while lying in bed.

Other objects and advantages will be apparent from the following description of one embodiment of the invention and the novel features will be particularly pointed out hereinafter in connection with the appended claims.

In the accompanying drawings:

Fig. 5 is a fragmentary section thereof, on line 5—5, Fig. 4.

Fig. 6 is a transverse elevation thereof, partly in section, on line 6—6, Fig. 5.

Figs. 7 to 12 are similar elevations, partly in section, on line 7—7, Fig. 5, showing different positions of the parts.

Fig. 21 is an end view of the table top showing still another position of the parts.

Fig. 22 is a fragmentary sectional view, taken approximately on line 7—7, Fig. 5, showing a slightly modified construction and showing another position of the parts of the mechanism for supporting the middle section of the table top in an angular position.

Fig. 23 is a fragmentary plan view thereof, taken on line 23—23, Fig. 22.

Fig. 24 is a perspective view of a track used in connection with the guiding of the lower end of the latch which supports the center section of the table in various inclined positions.

Figure 1:
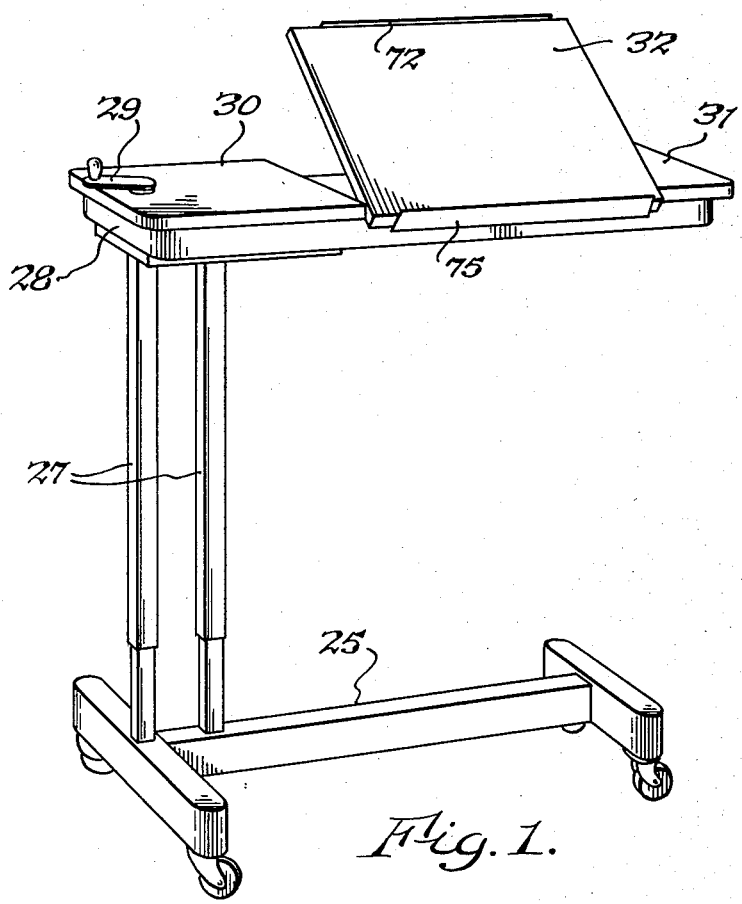
Fig. 1 is a perspective view of an overbed table provided with a table top having adjusting means embodying this invention, the center section of the table top being shown in an inclined position.

The overbed table illustrated by way of example to show one embodiment of my invention includes a base 25 which may be of any suitable or desired construction adapted to be moved on the floor of a room. This base has one or more upright standards or posts 27 which support a table frame 28. The posts or columns 27 may be adjusted vertically in any desired manner to vary the elevation of the table top, the raising and lowering mechanism (not shown) being preferably actuated by means of a crank 29 which is shown in Fig. 1, but omitted for the sake of clarity from the remaining figures.

Figure 2:
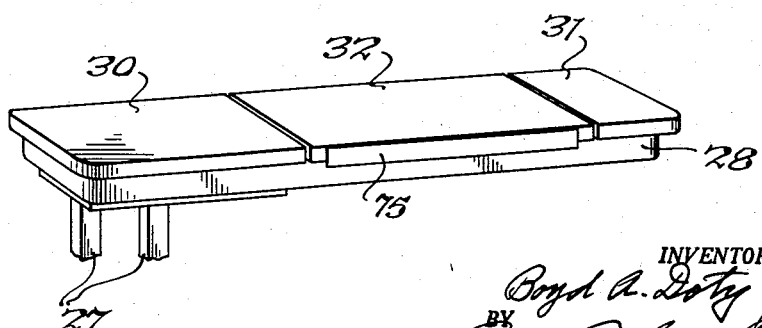
Fig. 2 is a perspective view of the upper part of the table showing the center section in horizontal position.

The frame 28 of the table top may be of any suitable or desired construction, such for example as a metal strip or band bent into substantially rectangular form and extending about the table and supported from the upright standards 27 in any suitable manner. This frame member 28 has secured thereon a table top which is preferably formed in three sections, the sections 30 and 31 being rigidly secured to the frame member 28 and the center section 32 being adjustable into various inclinations and into a horizontal position in alinement with the sections 30 and 31, as shown in Fig. 2.

Figure 3:
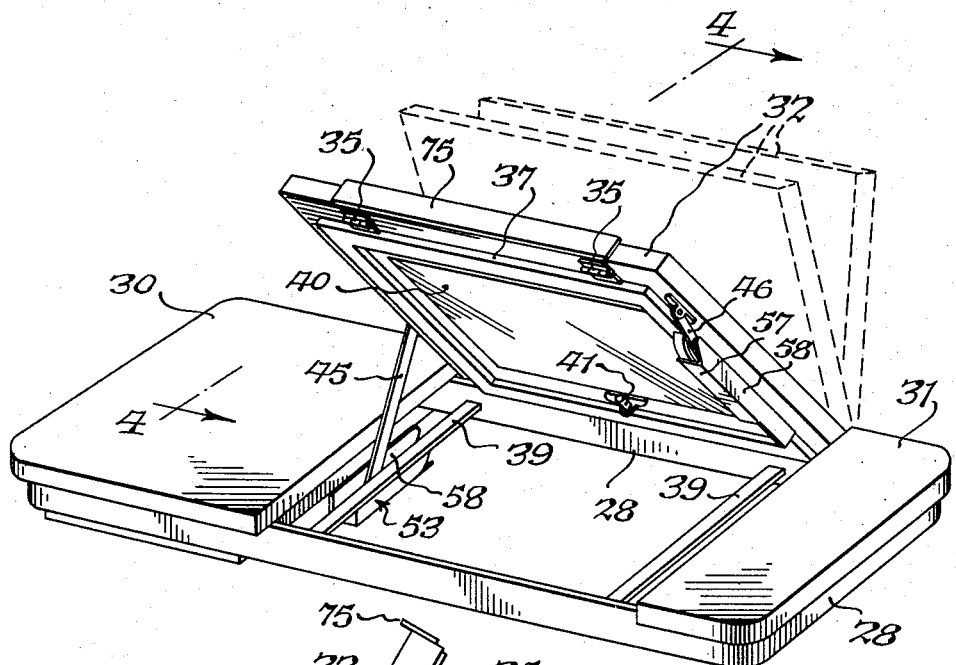
Fig. 3 is a perspective view, on an enlarged scale, showing various positions in which the center section of the table top may be held.
Figure 4:
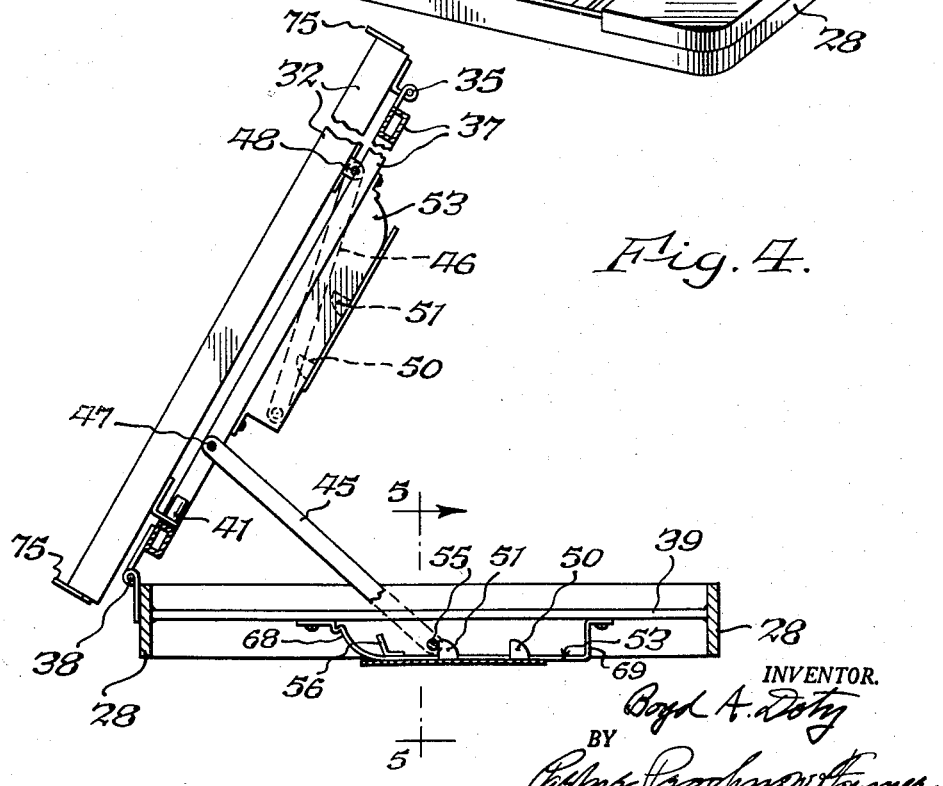
Fig. 4 is a transverse sectional elevation thereof, taken approximately on line 4—4, Fig. 3.

It is also desirable to mount the center section on a table top in such a manner that it may be swung from either longitudinal edge thereof, for example, the center section may be swung about a pivotal mounting at one edge thereof into various positions shown in Figs. 13 to 16 or if desired, this section of the table top may be swung about the other edge thereof into various positions as shown in Figs. 17 to 20. In order to accomplish this, the front portion of the center section is pivoted or hinged, for example, by means of hinges 35, to the front portion of an intermediate frame member 37 which in turn is hinged at its rear portion to the table top by means of hinges 38, as clearly shown in Fig. 4. Consequently, if the center section 32 is swung into the positions shown in Figs. 4 and 13 to 16, the center section together with the frame 37 is swung about the hinges 38. If, on the other hand, the center section is swung into the positions shown in Figs. 17 to 20, the frame member 37 remains in its lower position within the confines of the table frame 28 and the center section 32 will then be swung upwardly about the hinges 35. The positions of the center section of the table, as shown in Figs. 13 to 16, may be used for supporting books or other reading matter, for writing, and for other purposes, in which these inclinations are desirable, and the positions shown in Figs. 17 to 20 may be employed to use the table top for other purposes, in which case a tray or basin (not shown) may be supported on cross bars 39 having their ends secured to the table top frame member 28 and the center section may be provided on the under surface thereof with a mirror 40. If desired, a suitable detent 41, Figs. 3 and 4, may be employed for releasably holding the frame 37 and the center section 32 in fixed relation to each other.

The table top, as thus far described, has heretofore been used in connection with overbed tables and is not of itself a part of this invention.

The center section of the table top may be held in various adjusted positions by suitable ratchet mechanisms, which include latches 45 and 46, the latch 45 being pivoted at 47 on the intermediate frame member 37 and having the lower end thereof formed to cooperate with stops or teeth mounted on the table frame 28 and the other latch 46 is pivotally mounted at 48 on the center section 32 and cooperates with stops or teeth mounted on the frame member 37. These latches swing freely about their pivots so that the lower or free ends thereof may engage with any one of a series of stops or teeth, whereby the center section may be held in various inclined positions. Since the two ratchet mechanisms are identical in construction, only one will be described and the same reference characters will be applied to both of these mechanisms.

50 and 51 represent two stops or ratchet teeth with which the lower or free end of the latch 45 may engage. It will, of course, be understood that any desired number of these teeth may be provided. In the particular construction shown in the drawings, these teeth are formed integral with a rack bar or toothed member 53. The member 53 which cooperates with the latch 45 is suitably secured to the cross bar 39 and the corresponding toothed member or rack bar 53 which cooperates with the latch 46 is mounted on the frame member 37. The lower end of each of the latches 45 and 46 is provided with a lateral extension or pin 55, which extends into position to cooperate with the stops or teeth 50 and 51. 56 represents another stop or tooth which is the last one to be engaged by the latch when the middle section of the table top is in approximately vertical position. This tooth extends slightly higher than the teeth 50 and 51. This tooth 56 may be constructed in any suitable or desired manner, for example, by an angle-shaped piece which is welded or otherwise secured on the rack bar.

There is also provided with each rack bar a track member 57 in the form of a strip of metal arranged adjacent to the rack bar. This track member may be formed in one piece with the rack bar, or it may, as shown in the drawings, be a separate piece of metal secured to the undersurface of the rack bar in any suitable manner. The track member is preferably provided with an upwardly extending flange 58 and the rack or tooth bar has a similar, upwardly extending flange 59. These two flanges serve to hold the lower end of the latch and its pin 55 in correct relation to the tooth-supporting member 53 and the track member 57.

An alternative construction for providing the higher tooth or stop 56 is shown in Figs. 22 to 24, in which a tooth 56' is formed on the track member integral therewith by partly cutting the same out of the track member and bending it upwardly. The rack bar has a slot or opening 53' through which the tooth 56' extends. The track member may be secured to the lower surface of the rack bar by suitable fastening devices, such as screws or rivets 60, Figs. 22 and 23.

It is desirable to have the center section adjustable step by step when the same is moved from its horizontal position toward its upright position, but when the center section is returned from its upright position to the horizontal position, it is desirable that this return movement can be effected without having the latch engage the teeth 50 and 51. This is accomplished in the construction illustrated by means of a guide member which cooperates with the track 57 in such a manner that this action of the latch will result. This tooth engaging pin or rod 55 of the latch has a guide member 64 mounted thereon to swing freely about the rod 55. This guide member is of substantially rectangular form and its pivotal connection with the tooth-engaging pin 55 is adjacent to one corner of this rectangular guide. Consequently, when the guide is free to swing about its pin 55, it will occupy positions approximately as shown in Figs. 10 and 12. It will be noted that these positions are occupied by the guide when it is out of engagement with the track 57. This track is somewhat shorter than the path of travel of the lower end of the latch so that the guide member at opposite ends of its path of movement will be free to swing on the pin 55 without interference by the track.

The guide member has two track engaging portions, namely, the edges 65 and 66, and it will be noted that these edges are spaced at different distances from the pivotal axis about which the guide swings. Consequently, when the table top is in its horizontal position, the guide 64 will be free to swing about the tooth-engaging pin 55 and will occupy a position approximately as shown in Fig. 12. When the table top section 32 is swung upwardly, the guide 64 and the pin 55 will move to the left in Fig. 4 and upon continued movement in that direction, the edge 65 of the guide will contact with one end of the track 57 with the result that the guide will be swung about its pivot so that its edge 65 will lie on the track 57 and slide length-wise on this track throughout upward swinging of the table top. When the guide is in this position, the tooth-engaging pin 55 will be held at such elevation that the pin 55 will ride over the curved surfaces of the teeth 51 and 52 and engage with the upright stop surfaces thereof, as clearly shown in Fig. 22, so that the latch will support the table top section 32 in any inclined position established by the teeth 51 and 52.

Suitable stop means are provided for preventing the swingable table top section from swinging to any material extent beyond its upright position. In the construction shown for this purpose, the rack bar has an upwardly curved stop portion 68 beyond which the pin 55 of the latch cannot move. The end of this stop portion and an upwardly extending other end 69 of the rack bar may also serve to secure the rack bar and track to a cross bar 39 of the table top or to the intermediate frame member 37.

Before reaching the end of its travel resulting from the raising of the table top section 32, the latch will pass over the higher tooth 56, as shown in Fig. 8, and will then move into the position shown in Fig. 9, in which the tooth 56 holds the latch in position to support the swingable table top section in approximately vertical position. When the rod or pin 55 passes over any tooth, it will, of course, rise upwardly, and the guide 64 will then take an inclined position, as shown for example in Fig. 8. However, when the pin 55 drops back into a holding position against an upright or stop face of a tooth, the guide will again move into a position in which its edge 65 will rest flatly on the track 57, as shown in Figs. 7 and 9.

When the latch moves into the limit of its movement in engagement with the stop 68, in which the center section 32 of the table is approximately upright, the guide will be supported only from the pin 55 and will be clear of the track 57, as shown in Fig. 10. The guide will, consequently, swing into a position in which its edge 65 is lowermost and when the swingable section 32 is swung in a return movement to a slight extent from its upright position, the guide will engage the left hand end of the track, as shown in Fig. 11, and will be swung about its pin 55 into the position shown in Fig. 11, in which the guide will hold the pins 55 at a higher position, so that it will readily pass over the teeth 51 and 52. However, in order to prevent the table top section 32 from moving forwardly and possibly injuring a hand of the user of the same, the pin 55 will first engage and be stopped by the higher tooth 56 so that the parts will occupy the position shown in Fig. 11, in which the table top will be inclined slightly away from its vertical position. If it is then desired to lower this table top section into its horizontal position, the user grasps the latch and elevates the lower or free end to clear the tooth 56, whereupon the guide 64 will support the free end of the latch at a sufficient elevation to clear the teeth 51 and 52, as shown in Fig. 11, in which the pin 55 is shown in this elevated position in broken lines over the tooth 51. When the section 32 has been lowered into its horizontal position, the guide 64 will then be beyond the end of the track 57 and will hang from the pin 55, as shown in Fig. 12, in which position, the edge 65 will again be engaged by the track 57 when the table top section 32 is raised, to cause the latch to travel along the rack bar with its pin 55 in position to engage the teeth 51, 52 and 56, and thus hold the section 32 in correspondingly inclined positions.

Figure 13:
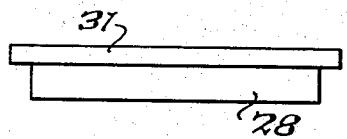
Figs. 13 to 16 are end elevations of the table top showing the center section thereof in different positions.

Figs. 13 to 16 inclusive illustrate different positions of the swingable section 32 of the table top, Fig. 13 showing the table with this section in horizontal position.

Figure 14:
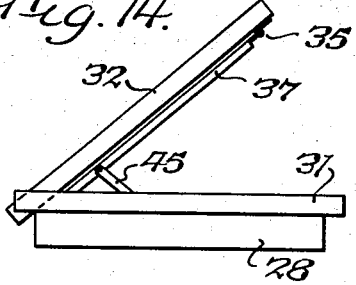
Figure 15:
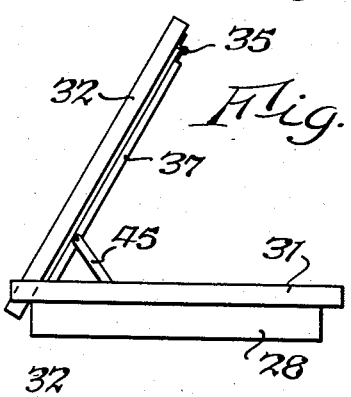
Figure 16:
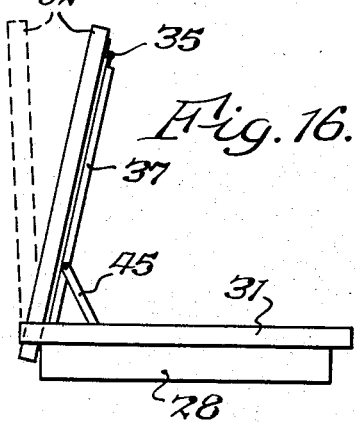

Fig. 14 shows the table top when the latch 45 is in engagement with the tooth 50, and Fig. 15 shows the corresponding position of the table top section 32 when the latch is in engagement with the tooth 51. In Fig. 16, the full line position of the section 32 is that occupied when the latch is in engagement with the higher tooth 56 and the broken line position shows the section 32 in the limit of its movement, such as illustrated in Fig. 10.

Figure 17:
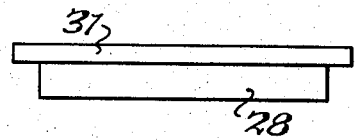
Figs. 17 to 20 are similar views showing the center section of the table top swung into different positions in the opposite direction from those shown in Figs. 13 to 16.

Fig. 17 shows the table top when the movable section 32 is again lowered into its horizontal position after the latch has been moved manually out of engagement with the tooth 56.

Figure 18:
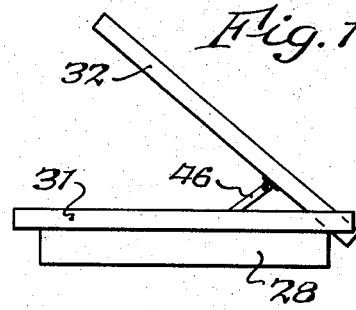
Figure 19:
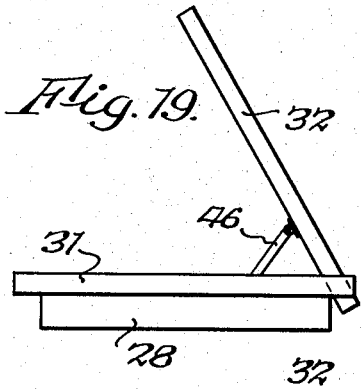
Figure 20:
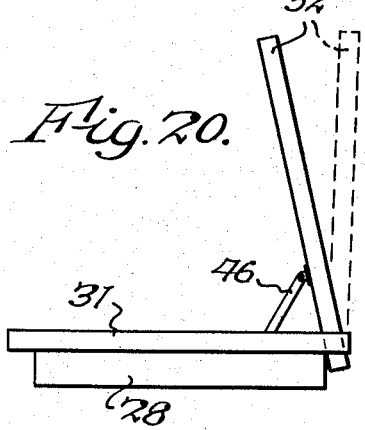

Figs. 18 to 20 show different positions of the movable section 32 when the table top is swung about its opposite edge and is supported in various positions by means of the latch 46. When in these positions, the frame member 37 remains in its lower or horizontal position and the various inclinations of the section 32 are those when the latch 46 is in engagement respectively with the teeth or stops 50, 51 and 56 respectively. The table top is also shown in broken lines in its upright position when the latch is in the position indicated in Fig. 10.

By means of a combination of adjustments of the swingable section 32 of the table top and the frame 37, the section 32 can be swung into a large number of additional positions. For example, in Fig. 21, I have shown the movable section 32 in a position in which a patient lying in bed may use the mirror on the back of the section 32 to see his face.

When the table is used for reading, a magazine or book may readily be supported on the section 32 by means of a ledge 75, Figs. 1 and 2, which may be supported in an operative position as shown in Fig. 1, or which may be moved and held in an inoperative position as shown in Fig. 2 with its upper edge flush with the table top.

The construction for supporting the table top section 32 in various positions requires the minimum of mechanism and mechanical parts and is very easily operated by a patient or other user of the same. It will be noted that when the table top section 32 is in vertical position as shown in broken lines in Figs. 16 and 20, if it should inadvertently swing forward toward the user, it can only swing back to the full line positions shown in Figs. 16 and 20, since the latch will then engage the higher tooth 56. When it is desired to move this section of the table top into horizontal position, the latch must first be raised manually to clear the tooth 56.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A table top having a relatively stationary part and a swingable part having a pivotal connection therewith to swing into various angular relations to said relatively stationary part, a latch pivoted at one end thereof on said swingable part, a succession of stops with which the other end of said latch may engage when swinging in one direction to hold said swingable part in different angular positions, a latch guide member movably mounted on said other end of said latch, a track along which said guide member moves when said swingable part is swung about said pivotal connection, said guide member having two track engaging edges spaced at different distances from said other end of said latch, one of said edges being spaced from said other end of said latch at such distance that when in engagement with said track, said latch is supported in position to engage with said stops and the other edge when in engagement with said track supporting said latch in a position clear of said stops, and means for shifting said guide member at each end of the path of movement of said latch to reverse the position of said guide member with relation to said track.

2. A mechanism for supporting a swingable part in various relations to another part, said mechanism including a latch pivoted at one end on said swingable part, a series of stops arranged to be engaged by the other end of said latch for supporting said swingable part in different angular positions, a track arranged adjacent to the path of movement of said other end of said latch, a guide pivoted on said other end of said latch and movable along said track, said guide having two track engaging portions arranged at different distances from the pivotal connection of said guide with said latch, means for swinging said guide on its pivot to place either of said track engaging portions into engagement with said track, one of said portions supporting said other end of said latch in position to engage said stops and the other of said portions supporting said other end of said latch in position out of engagement with said stops.

3. Mechanism according to claim 2, in which said track terminates short of the path of movement of said guide to permit said guide to swing on its pivotal connection with said latch, one of said ends of said track engaging said guide to swing the same into a position with one track engaging portion thereof rides on said track and the other end of said track swinging said guide into position in which the other track engaging portion thereof rides said track.

4. Mechanism for supporting a part of a table top in inclined positions including a latch supported at one end in pivotal relation to said table part, a plurality of stops positioned to be engaged by the other end of said latch for holding said table top in different angular positions, one of said stops located near the end of the path of movement of said latch when said table top part is near said upright position being higher than an adjacent stop, guide means cooperating with said latch and including a guide member pivotally mounted on said latch, a track on which said guide member rests during a part of the movement of said latch in either direction, said track terminating short of the ends of the path of travel of the stop engaging part of said latch to permit said guide member to swing about its pivotal connection into different relationships to said track, said guide member when said table top part is swung upwardly from its horizontal position having one part thereof riding on said track for supporting said latch in position to engage with said stops, and said guide member when said table top part is swung in the opposite direction having another part thereof riding on said track for holding said latch in a position to move clear of the lower stops and to engage only with said higher stop.

References Cited in the file of this patent

UNITED STATES PATENTS

| 264,049 | Tucker | Sept. 5, 1882 |
| 1,932,543 | Dow | Oct. 31, 1933 |
| 2,006,603 | Nordmark et al. | July 2, 1935 |
| 2,252,215 | Stearns | Aug. 12, 1941 |
| 2,346,919 | Hillenbrand | Apr. 18, 1944 |
| 2,471,646 | Norwood | May 31, 1949 |
| 2,685,486 | Woller | Aug. 3, 1954 |
| 2,730,422 | Holmberg | Jan. 10, 1956 |
| 2,742,336 | Holmberg | Apr. 17, 1956 |